(12) United States Patent
Wang et al.

(10) Patent No.: US 8,175,069 B2
(45) Date of Patent: May 8, 2012

(54) METHOD AND APPARATUS OF RESOURCE MANAGEMENT FOR MULTIMEDIA BROADCAST MULTICAST SERVICES

(75) Inventors: Jin Wang, Central Islip, NY (US); Peter S. Wang, E. Setauket, NY (US); Rajat P. Mukherjee, Montreal (CA); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 991 days.

(21) Appl. No.: 12/110,012

(22) Filed: Apr. 25, 2008

(65) Prior Publication Data

US 2008/0267109 A1    Oct. 30, 2008

Related U.S. Application Data

(60) Provisional application No. 60/914,576, filed on Apr. 27, 2007, provisional application No. 60/942,877, filed on Jun. 8, 2007.

(51) Int. Cl.
*H04J 1/00* (2006.01)
(52) U.S. Cl. ............... 370/343; 370/342; 370/344
(58) Field of Classification Search .......... 370/332, 370/342, 343, 344; 455/436, 518, 444, 454
See application file for complete search history.

(56) References Cited

U.S. PATENT DOCUMENTS

| 7,437,178 | B2 | 10/2008 | Jeong et al. | |
| 7,570,916 | B2 | 8/2009 | Xiao et al. | |
| 2003/0232594 | A1 | 12/2003 | Shaheen | |
| 2006/0252377 | A1* | 11/2006 | Jeong et al. | 455/67.13 |

FOREIGN PATENT DOCUMENTS

| CN | 1467938 | 1/2004 |
| CN | 1801961 | 7/2006 |
| EP | 1 492 249 | 12/2004 |
| WO | WO 2005/006596 | * 1/2005 |

(Continued)

OTHER PUBLICATIONS

Alcatel-Lucent, "E-MBMS Transmission Mode Selection and Switching", 3GPP TSG-RAN WG2#58bis, R2-072356, (Orlando, Jun. 25-29, 2007).

(Continued)

*Primary Examiner* — Ricky Ngo
*Assistant Examiner* — Dewanda Samuel
(74) *Attorney, Agent, or Firm* — Robert J. Irvine, III; Eric Berkowitz

(57) ABSTRACT

A method and apparatus of resource management for multimedia broadcast multicast services (MBMS) are disclosed. A wireless transmit/receive unit (WTRU) sends a measurement report and an MBMS reception performance report to a network. Single frequency network (SFN) area change may be made based on cell reselection information, WTRU macrodiversity MBMS reception performance, neighbor cell signal strength reported by a WTRU, interference level measured by the WTRU, a number of WTRUs in a cell, service priority, WTRU class, WTRU mobility trend, WTRU location to a cell center, WTRU MBMS reception interference level, etc. The MBMS service on/off decision and/or point-to-point (PTP) to point-to-multipoint (PTM) switching may be made based on a channel condition of a WTRU. The channel condition may be determined based on whether the WTRU is in in-sync or out-of-sync in MBMS reception, consecutive negative acknowledgements (NAKs) within a certain time window, measured pathloss from a reference channel, etc.

12 Claims, 3 Drawing Sheets

FOREIGN PATENT DOCUMENTS

WO        2006/138203        12/2006

OTHER PUBLICATIONS

Alcatel-Lucent, "MBMS Transmission Mode Depending on Used Resources", 3GPP TSG-RAN #59 WG 2 LTE, R2-073145, (Athens, Aug. 20-24, 2007).

Catt, "Consideration About SFN Management", 3GPP TSG RAN WG3 Meeting #55bis, R3-070659, (Malta, Mar. 27-30, 2007).

Ericsson, "LTE MBMS Functionality", 3GPP TSG-RAN WG2 #58, R2-071827, (Kobe, Japan, May 7-11, 2007).

Ericsson, "LTE MBMS Functionality", 3GPP TSG-RAN WG2#56bis, R2-070572, (St. Louis, Missouri, Feb. 12-16, 2007).

Huawei, "SFN Area Dynamic Configuration", 3GPP TSG RAN WG3 Meeting #55bis, R3-070547, (St. Julian, Malta, Mar. 27-30, 2007).

Mitsubishi Electric, "Semi-Static and Dynamic SFN Areas for MBMS Services", 3GPP TSG RAN WG3 Meeting #53bis, R3-061510, (Seoul, Korea, Oct. 10-13, 2006).

Huawei, "SFN Area Dynamic Configuration", 3GPP TSG RAN WG3 Meeting #55bis, R3-070547, (St. Julian, Malta, Mar. 27-30, 2007).

Mitsubishi Electric, "Semi-Static and Dynamic SFN Areas for MBMS Services", 3GPP TSG RAN WG3 Meeting #53bis, R3-061510, (Seoul, Korea, Oct. 10-13, 2006).

Nokia et al., "MBMS Agreements", 3GPP TSG-RAN WG2 Meeting #58 R2-071733, (Kobe, Japan, May 7-11, 2007).

Panasonic, "TA-Based SFN Area Configuration", 3GPP TSG RAN WG3 Meeting #54, R3-061666, (Riga, Latvia, Nov. 6-10, 2006).

Third Generation Partnership Project, "Technical Specification Group Services and System Aspects; Requirements for Evolved UTRA (E-UTRA) and Evolved UTRAN (E-UTRAN) (Release 7)", 3GPP TR 25.913 V7.3.0 (Mar. 2006).

Third Generation Partnership Project, "Technical Specification Group Radio Access Network; Feasibility Study for Evolved Universal Terrestrial Radio Access (UTRA) and Universal Terrestrial Radio Access Network (UTRAN) (Release 7)", 3GPP TR 25.912, V7.1.0 (Sep. 2006).

Third Generation Partnership Project, "Technical Specification Group Radio Access Network; Feasibility Study for Evolved Universal Terrestrial Radio Access (UTRA) and Universal Terrestrial Radio Access Network (UTRAN) (Release 7)", 3GPP TR 25.912, V7.2.0 (Jun. 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.0.0 (Mar. 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.4.0 (Mar. 2008).

Third Generation Partnership Project, "Technical Specification Group Services and System Aspects; Multimedia Broadcast/Multicast Service (MBMS); Architecture and Functional Description (Release 7)", 3GPP TS 23.246 V7.2.0 (Mar. 2007).

Third Generation Partnership Project, "Technical Specification Group Services and System Aspects; Multimedia Broadcast/Multicast Service (MBMS); Architecture and Functional Description (Release 7)", 3GPP TS 23.246 V7.4.0 (Sep. 2007).

Third Generation Partnership Project, "Technical Specification Group Services and System Aspects; Multimedia Broadcast/Multicast Service (MBMS); Architecture and Functional Description (Release 8)", 3GPP TS 23.246 V8.1.0 (Dec. 2007).

* cited by examiner

METHOD AND APPARATUS OF RESOURCE MANAGEMENT FOR MULTIMEDIA BROADCAST MULTICAST SERVICES

CROSS REFERENCE TO RELATED APPLICATION

This application claims the benefit of U.S. Provisional Application Ser. Nos. 60/914,576 filed Apr. 27, 2007 and 60/942,877 filed Jun. 8, 2007, which are incorporated by reference as if fully set forth.

FIELD OF INVENTION

This application is related to wireless communications.

BACKGROUND

The objects of evolved universal terrestrial radio access (E-UTRA) and universal terrestrial radio access network (E-UTRAN) are developing a radio access network towards a high data rate, low latency, packet optimized system with improved system capacity and coverage. In order to achieve these objects, an evolution of the radio interface as well as the radio network architecture is being considered. For example, instead of using code division multiple access (CDMA) which is currently used in third generation partnership project (3GPP), orthogonal frequency division multiple access (OFDMA) and frequency division multiple access (FDMA) are proposed air interface technologies to be used in the downlink and uplink transmissions, respectively. One big change is to apply all packet switched service in long term evolution (LTE), which means all the voice calls will be transferred on the packet switched basis.

3GPP Release 6 defined multimedia broadcast multicast services (MBMS). It is a counterpart of other multicast services operating in other spectrum, such as digital video broadcasting-handheld (DVB-H). MBMS allows downlink data to be transmitted from a single source to multiple recipients in broadcast or multicast modes. The 3GPP release also defined the MBMS channels, scheduling, bearers, procedures, etc.

In the 3GPP LTE project, a new E-UTRAN and evolved core network are introduced. This requires the changes to the current specifications for MBMS so that the new architecture can support MBMS service efficiently.

Two MBMS transmission modes are defined in E-UTRA/E-UTRAN: multi cell transmission and single cell transmission. Multi cell transmission uses single frequency network (SFN) operation to improve the cell edge performance by combining MBMS signals from other cells. An SFN is a broadcast network where several transmitters simultaneously send the same signal over the same frequency channel. The SFN operation needs additional synchronization mechanism and much more transmitting power on an MBMS traffic channel (MTCH) to cover the cell edge.

Single cell transmission transmits as a unicast service for some special service requirement and less user instance. Single cell transmission may use technologies, such as hybrid automatic repeat request (HARQ), multiple-input multiple-output (MIMO) or the like to improve the quality of service (QoS) of the MBMS service to specific users.

For the single cell transmission, there are two different transmission schemes: single cell point to multi-point (SC-PTM) and single cell point to point (SC-PTP). The single cell transmission scheme is determined based on the actual user distribution status.

The transmission mode/scheme is a part of radio configuration parameters for an evolved MBMS (E-MBMS) service. The transmission mode selection is made by an MBMS control entity (MCE). The single cell transmission scheme is determined by an evolved Node-B.

Network and resource optimization for MBMS service is made based on statistics that reflects the performance of the air interface. The statistics is collected regularly from a user equipment (UE). The statistics is collected from the layers of the radio protocol stack which maintains counters, (e.g., counters for detected procedures, successful and unsuccessful procedures, successful and unsuccessful reception of data, etc). It is common that such counters are maintained according to geographical information, (e.g., per cell). Such statistics may be used for continuous network performance monitoring and to verify that the network is operating correctly and efficiently.

Since large part of MBMS services will be transmitted via an SFN (multicast broadcast SFN (MBSFN)), configuring the SFN area is important. Static operation and maintenance (O&M) SFN configuration and dynamic SFN configuration (standardized) have been considered.

The static O&M SFN configuration limits the flexibility for MBMS services (especially for subscription based services). In case of static O&M configured SFN, a lot of resources (both radio and transport) would be wasted since MBMS content is always transmitted within the full SFN coverage area (most likely the MBMS service area), regardless of the distribution of users in the network. This is illustrated in FIG. 1. Small dots represent UEs. The SFN areas from a coverage planning point of view need to be over dimensioned in order to compensate for lacking the knowledge of where interested users are located. The static O&M configured SFN may suffice for services that are localized to a specific small area, but lacks the flexibility to adjust with respect to the actual load and usage from MBMS user population and location.

Dynamic configuration of SFN area based on user demand and changes of user distribution have been proposed. This dynamic SFN configuration is illustrated in FIGS. 2A and 2B. As the user distribution changes (small dots represent UEs), the SFN area is also adjusted from FIG. 2A to FIG. 2B. Dynamic SFN configuration may lead to more efficient usage of resources because it allows creation of an SFN for the duration of specific services, and local resource is optimized in a cell, (switching from multi cell transmission (i.e., SFN) to single cell transmission, or vice versa). An MCE dynamically creates an SFN area based on certain input. The MCE may also modify the SFN area throughout the service duration given the input, such as user joining or leaving the services of the SFN area.

Dynamic SFN area configuration based on tracking area (TA) update is slow to adapt to UE mobility. Expanding the SFN area based on TA may lead to adding more cells/eNode-Bs than necessary to the current SFN area, which will waste resources. Dynamic SFN area configuration based on cell update is too dynamic so that it may cause more system complexity and may ignore the SFN gain for UEs if only one cell is added each time. Making SFN area expansion and shrinking decision based on the criteria such as UE numbers may lead to degradation of other UEs MBMS reception performance, or too often activation and deactivation of MBMS service for certain eNode-Bs, which cause extra system complexity.

In the single cell MBMS transmission mode, specific MBMS on/off operation is dependent on whether there are UEs interested in specific MBMS service. In 3GPP release 6/7 MBMS, a counting procedure is used to obtain the number of interested UEs within one mixed cell for specific MBMS service. The MBMS on/off decision and PTP/PTM switch decision are made based on the counting results by the radio resource management (RRM) entity.

The problem of using counting procedure is that the network is not aware of UE situation. In addition, if counting is used more frequently it will cause signaling overhead, and if counting is used less frequently it may delay the MBMS on/off operation and PTP/PTM switch. This is a big issue when unicast traffic load is heavy within a cell. For example, if no UE is interested in specific MBMS service but at the same time there is heavy demand for downlink unicast services from other UEs, waiting for counting result to make resource re-allocation decision for MBMS service will cause resource waste.

In LTE, the resource may be dynamically allocated. This requires more efficient and flexible resource allocation strategy when MBMS and unicast services are supported together within one cell, (i.e., mixed cell). For example, when a UE is out-of-sync and cannot receive the MBMS service correctly for a while, it will be a waste of resource if MBMS service is still delivered while there are more unicast service requests.

It has been proposed to allocate different MBMS services with different MBMS priorities to a dedicated carrier and a mixed cell separately. For example, a long term MBMS service, (such as TV broadcast), may be transmitted through an MBMS dedicated cell and a short term MBMS service, (such as short messages), may be transmitted via a mixed cell. However, there is problem if one or more UEs want to listen to different MBMS services simultaneously.

SUMMARY

A method and apparatus of resource management for MBMS are disclosed. A wireless transmit/receive unit (WTRU) sends a measurement report and an MBMS reception performance report to a network. SFN area change may be made based on cell reselection information, WTRU macro-diversity MBMS reception performance, neighbor cell signal strength reported by a WTRU, interference level measured by the WTRU, a number of WTRUs in a cell, service priority, WTRU class, WTRU mobility trend, WTRU location to a cell center, WTRU MBMS reception interference level, etc. The MBMS service on/off decision and/or PTP to PTM switching may be made based on a channel condition of a WTRU. The channel condition may be determined based on whether the WTRU is in in-sync or out-of-sync in MBMS reception, consecutive negative acknowledgements (NAKs) within a certain time window, measured pathloss from a reference channel, etc.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a UE, a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

It should be noted that the embodiments disclosed herein are applicable to any wireless communication systems including, but not limited to, LTE system, high speed packet access (HSPA) system, or the like.

The dynamic SFN area (re)configuration may be performed based on a hypothesis timer value(s) in order not to make hasty cell adding or deleting decision. For example, if one WTRU has left a cell for more than a configured period of time, the network may decide to remove that cell from the MBMS SFN area. This can avoid the ping-pong effect.

An SFN area expansion or shrinking decision after initial SFN area configuration may be made based on evaluation of at least one of the factors below:

1) Cell reselection or tracking area (TA) update information. When a WTRU is at SFN area edge, this is independent whether the WTRU is in an LTE_Idle or LTE_Active state;

2) WTRU macro-diversity performance for MBMS reception. The MBMS reception performance may be reported by the WTRU currently receiving MBMS services or intending to receive MBMS services to the network to let the network make a decision on how many new cells need to be activated for MBMS transmission adjacent to the new cell the WTRU is moving in to construct an MBMS sub-area that may provide an MBMS gain;

3) Neighbor cell signal strength list reported by the WTRU. This is another criteria for the network to know which adjacent cells may provide better signal strength for MBMS reception;

4) Interference level measured by the WTRU;

5) Counting results;

6) Service priority;

7) WTRU class; and

8) Other factors, such as WTRU mobility trend, location to cell center, WTRU MBMS reception interference level, or the like.

Considering these factors together, the NW may avoid over-expansion to the current SFN area by adding more new eNode-Bs than needed for a reasonable MBMS SFN gain, or over-shrinking by removing eNode-Bs from current SFN area just because of one or a small number of WTRUs powering off or leaving the cell(s) within the eNode-B(s) area, which may deteriorate reasonable MBMS SFN gain for other WTRUs. In addition, the dynamic SFN area configuration considering these factors would avoid activating or deactivating MBMS services too often, which causes more signaling overhead and context transfer and synchronization complexity.

Figure 1:
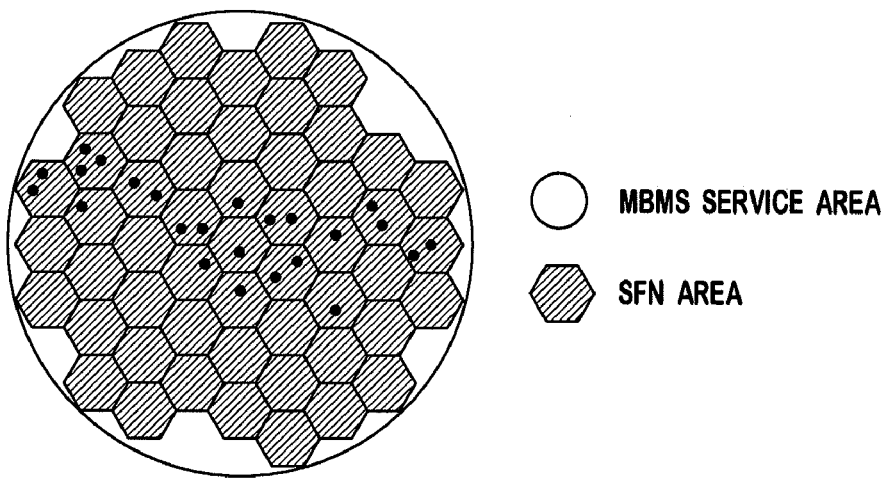
FIG. 1 shows static O&M configured SFN area.
Figure 2A:
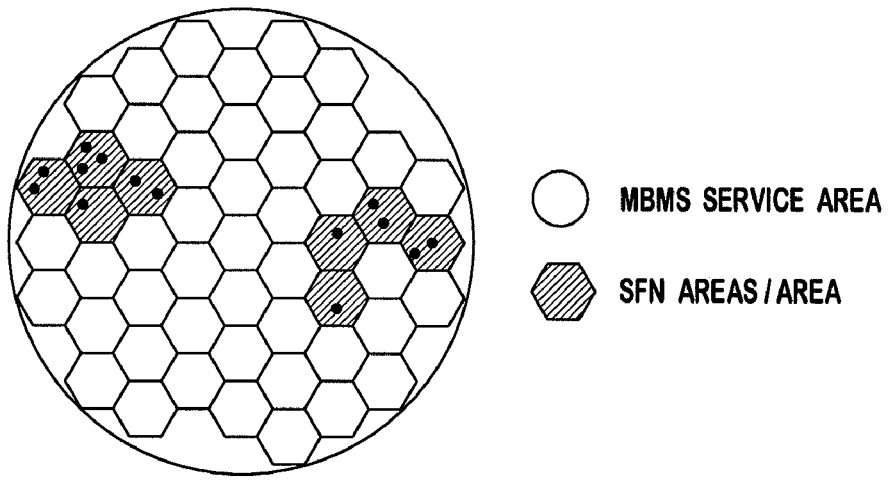
FIGS. 2A and 2B show dynamic SFN area configuration.
Figure 2B:
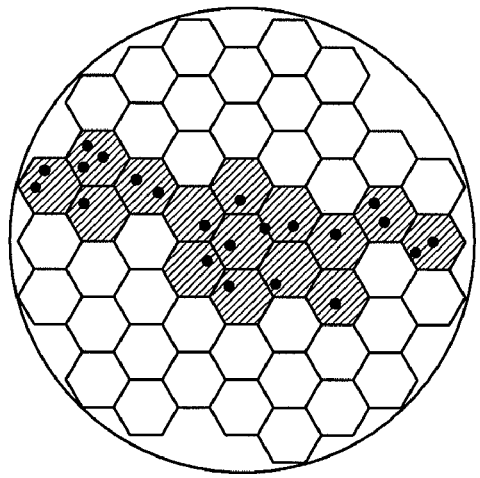
Figure 3:
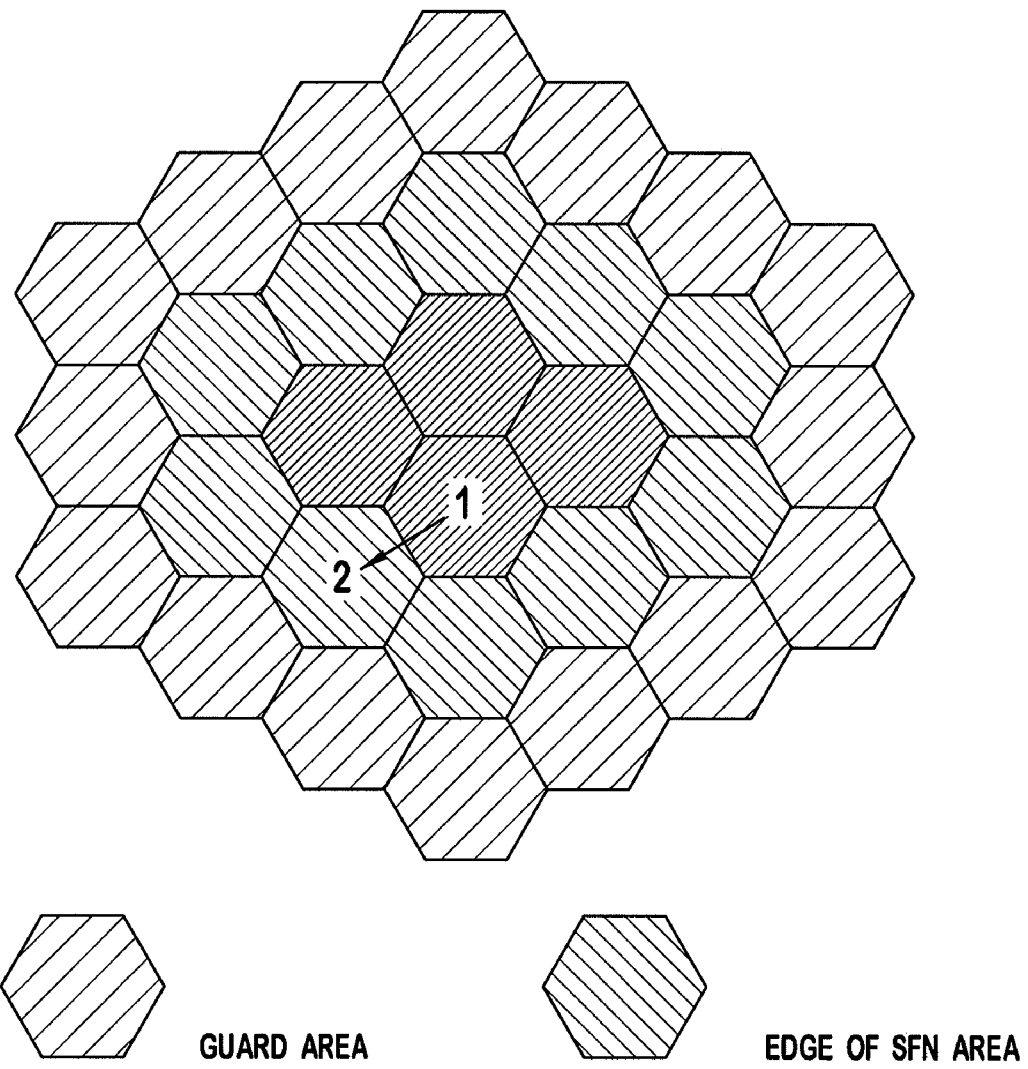
FIG. 3 shows the situation when a WTRU is moving out of the current SFN area.

FIG. 3 shows the situation when a WTRU is moving out of the current SFN area. When a WTRU is moving out of the current SFN area, more than one new cell may be activated and added to the current SFN area for the same MBMS service. This is independent of the WTRU state (LTE_Idle or LTE_Connected states).

Figure 4:
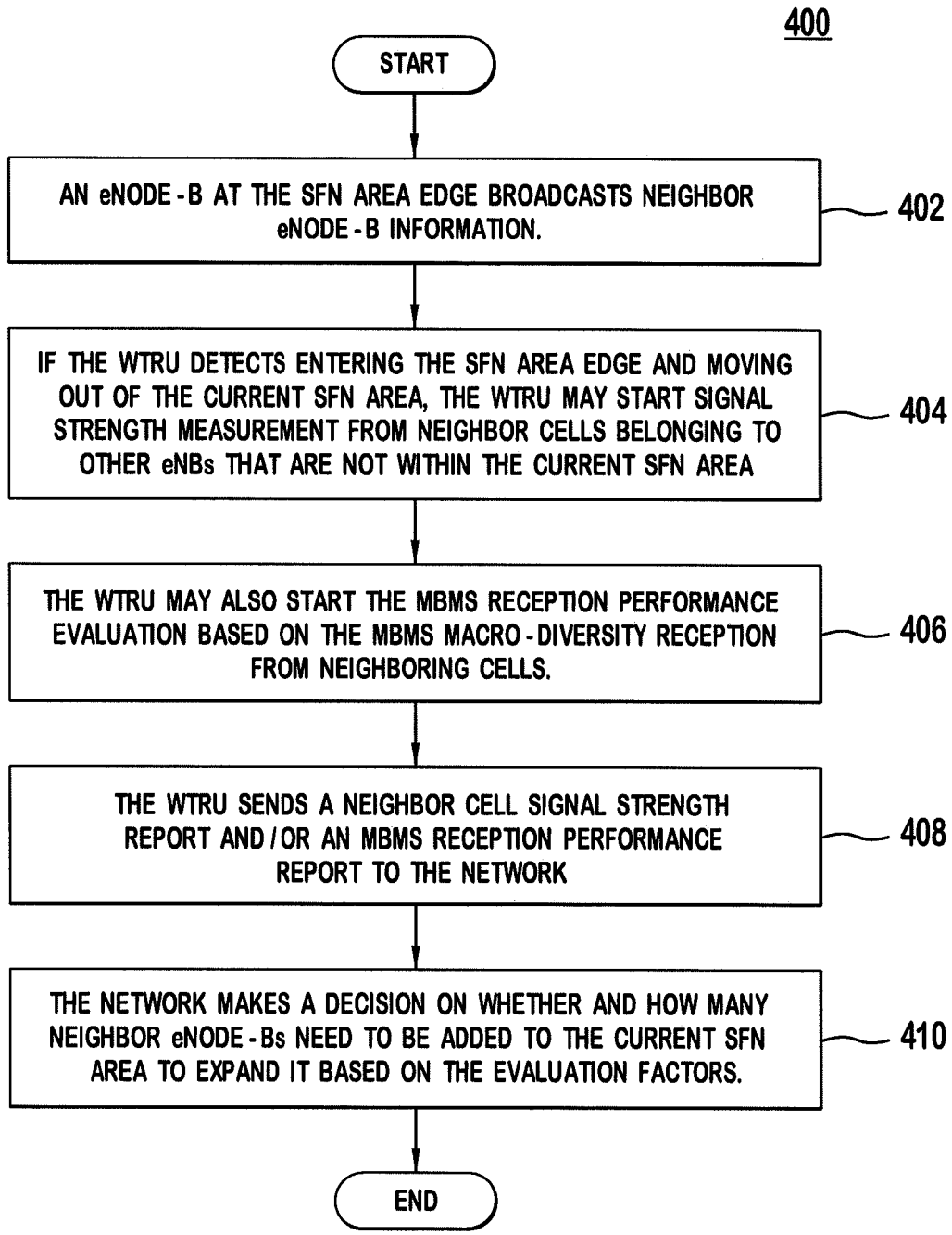
FIG. 4 is a flow diagram of a process 300 for dynamic SFN area configuration when a WTRU is moving out of the current SFN area.

FIG. 4 is a flow diagram of a process 400 for dynamic SFN area configuration when a WTRU is moving out of the current SFN area. ENode-Bs at the SFN area edge broadcast neighbor eNode-B (cells) information (step 402). If the WTRU detects entering the SFN area edge and moving out of the current SFN area, the WTRU may start signal strength measurement from neighbor cells belonging to other eNode-Bs that are not within the current SFN area (step 404). The WTRU may also start the MBMS reception performance evaluation based on the MBMS macro-diversity reception from neighboring cells (step 406).

The WTRU sends a neighbor cell signal strength report and/or an MBMS reception performance report to the network (step 408). The WTRU may send the reports whenever the WTRU detects that the WTRU is at SFN area edge. Alternatively, the WTRU may send the reports only if the MBMS reception performance is below a preconfigured threshold value $V_{MBMS\_Rep\_Performance}$ for a preconfigured period of time $T_{MBMS\_Rep\_Performance}$. Only the N strongest signal strength measured from neighbor cells may be reported. The parameter N may be included in the broadcast information from the eNode-B at the SFN area edge or configured through RRC signaling. To minimize signaling overhead, the measurement report, (e.g., signal strength, pathloss, etc.), from each cell may be combined with TA or routing area (RA) update message.

The network then makes a decision on whether and how many neighbor eNode-Bs need to be added to the current SFN area to expand it based on the evaluation factors listed above, (i.e., WTRU mobility update (cell or TA update), MBMS reception performance, and neighbor cells signal strength, WTRU measured interference level, counting results, etc.) (step 410).

The procedure 400 may be applied when dynamic SFN area configuration is TA-based.

In case a WTRU is moving from the SFN area edge towards the center of the SFN area, SFN area shrinking may occur. In this situation, besides the number of WTRUs in the cell obtained by the conventional counting procedure, steps 406-410 in FIG. 4 may be performed for dynamic SFN area configuration. The network makes the decision to remove certain eNode-B(s) not only based on the number of WTRUs within the cell, but also based on the factors listed above, such as WTRU mobility update (cell or TA update), MBMS reception performance, and neighbor cells signal strength, WTRU measured interference level, counting results, service priority, WTRU class, etc.

In case that a WTRU is within the SFN area, the procedure for dynamic SFN configuration is similar to the case when a WTRU is moving from the SFN area edge towards the center of the SFN area and SFN area shrinking may occur.

In case that a WTRU is moving away from the SFN area and enters another SFN area, the WTRU reads the approaching cell's broadcast channel (BCH) to find out the possible SFN identity (ID) change and reports the SFN ID change to the network to avoid over-expansion of one SFN into another SFN service coverage. If the same MBMS service that the WTRU is receiving does exist in the new SFN area, the WTRU performs necessary adjustment in terms of service timing, radio bearer configuration and other user-plane adjustment to continue receiving the MBMS service.

Within the SFN area (or on its edge), there are likely to be a few mixed cells that allow the WTRU to do their uplink signaling. WTRUs may camp on these few cells while receiving their SFN transmission from other cells. If the WTRU is required to indicate some uplink signaling, (e.g., measurement, counting, etc.), during the interruption times when they are allowed to do so all of them will send their messages on these few cells. The conventional counting procedure is simply a cell update procedure (in case of LTE_Connected mode) or a radio resource control (RRC) connection procedure (in case of LTE_Idle mode). An additional information element (IE) may be sent on these messages, (RRC connection request or cell update request messages), if the reason for sending the message is the counting procedure, to indicate the cell IDs of all cells being used by the WTRU for macro-diversity MBMS reception. This will provide an indication of the distribution within the SFN area. This IE is not required in measurement reports because measurement reports indicate which cells are being measured.

In single cell MBMS service, the network may signal to a WTRU if PTP or PTM is configured for MBMS service. If PTP MBMS transmission is configured for the WTRU, the WTRU may indicate to the eNode-B whether the WTRU is interested in continuing the MBMS service. If the WTRU plans to suspend the MBMS reception, the WTRU may indicate if the suspension is temporary or not. This indication assists the eNode-B in deciding whether the radio bearer (RB) configuration for that WTRU be released or maintained.

The MBMS on/off operation of single cell MBMS service is not only dependent on counting of interested WTRUs, but also on the channel condition of the WTRU. The channel condition of the WTRU for MBMS reception in single cell may be reflected as the followings:

1) Whether the WTRU is in in-sync or out-of-sync in MBMS reception;

2) Consecutive negative acknowledgements (NAKs) to the eNode-B within a certain time window. The number of NAKs and window duration may be specified by the network during single cell MBMS service establishment; and 3) Measured pathloss from a reference channel.

At least one of the above factors may be used as the evaluation criteria along with the conventional counting results in deciding the PTP/PTM switching. For example, if a WTRU detects out-of-sync situation for MBMS reception, the WTRU reports this situation to the eNode-B for a timely decision whether to turn off the MBMS service before initiating the conventional counting procedure. If the eNode-B decides to turn off the MBMS service, the RB configuration for the WTRU may be released and the resource may be re-allocated to other services. Alternatively, even if the eNode-B declares downlink out-of-sync, the eNode-B may keep the MBMS service and its RB configuration for a while since the WTRU may recover to a normal communication. In this case the radio resource for MBMS service may be temporarily re-allocated to other services, (e.g., higher priority unicast service), of other WTRUs. Once a WTRU detects in-sync situation again, the WTRU indicates this to the eNode-B for resumption of the MBMS service. The decision along with new RB configuration and resource allocation will be signaled to the WTRU through a MBMS control channel (MCCH).

If feedback is allowed in single cell MBMS service, the WTRU may send ACK/NAK (alternatively only NAK) to the eNode-B for the on-going MBMS reception. Once the WTRU detects erroneous MBMS reception continuously, the WTRU may send certain number of NAKs within specified time window. The WTRU may then signal to the eNode-B this situation and the eNode-B may decide to suspend the MBMS service and allocate the resource to other services or WTRUs. It is optional if the WTRU needs to signal to the eNode-B this situation, the eNode-B may make a decision based on the number and distribution of NAKs received within certain time window to evaluate the WTRU reception status to make proper MBMS service allocation decision.

When more than one WTRU is receiving the MBMS service, the MBMS service in that cell may be turned off when all WTRUs receiving MBMS service meet above criteria. However, the MBMS service may be turned on if there is one WTRU back to normal situation.

When more than one MBMS services are supported in one cell, those criteria may be evaluated for each MBMS service separately. The eNode-B decides whether the criteria should be applied to all MBMS services simultaneously.

When a WTRU has a higher priority unicast demand, the MBMS service may be turned off by the eNode-B if the demand of other higher priority services exceeds the downlink capacity and the eNode-B has to allocate radio resources to higher priority downlink services.

The MBMS service may be resumed if there is enough downlink capacity available for MBMS transmissions. When several MBMS services are supported in a cell, these MBMS services may be turned on according to priority based on the downlink resource availability sequentially, or they are all be turned on if there is enough capacity.

Based on the duration of the higher priority unicast service request, (e.g., if the services need resources longer than a specified threshold), the MBMS service may be transferred to an MBMS dedicated carrier to continue the service if the WTRU needs simultaneous unicast and MBMS service. The configuration of transferred MBMS service to the dedicated MBMS carrier may be signaled to the WTRU by the eNode-B.

In an MBMS multi-cell mode, MBMS on/off in any cell may be evaluated based on the above criteria and rules.

When making a PTP/PTM switching decision, in addition to the conventional counting procedure, the criteria used for MBMS on/off decision may be used. Between two counting processes, if a WTRU detects change in channel condition which will impact WTRU the MBMS reception for a certain period, the WTRU may report this channel condition change to the eNode-B and the eNode-B may make the PTP/PTM switching decision as well as the new resource allocation to the WTRU, which is signaled via an MCCH.

When MBMS PTM is supported in a single cell mode, if the eNode-B receives out-of-sync indications from many WTRUs which is more than a specified threshold for certain period of time, without initiating the counting process the eNode-B may decide to switch from MBMS PTM to PTP if the number of WTRUs to receive MBMS services decreases to certain point and if it is decided that PTP would be more efficient than PTM. Using these criteria timely reflects the WTRU situation change to make resource allocation more efficient than on a static basis. The same rule may be used when NAK criteria is used for PTM/PTP switch.

When PTM to PTP switching is triggered by the above criteria, if the eNode-B receives in-sync indications from WTRUs more than a configured threshold, the eNode-B may make the decision to switch from PTP to PTM.

In a single cell PTM scheme, if the number of WTRUs demanding higher priority services is more than a specified threshold, the eNode-B may decide to switch from PTM to PTP based on capacity and service request. When PTM to PTP switch is triggered by the service priority criteria and if the eNode-B receives the indications of less demand for higher priority service for less than a specified threshold, the eNode-B may make the decision to switch from PTP to PTM.

MBMS services may be partitioned into two classes according to their transmission characters:

Class 1: High-speed, long-term persistent services, such as mobile TV, streaming services, etc.; and Class 2: Low-speed, short-term services, such as a short message, still image transmission service, etc.

All MBMS services either class 1 or 2 may be kept on the dedicated MBMS carrier when WTRUs are in an RRC idle mode. This may avoid WTRUs to switch between dedicated MBMS carrier and mixed cell to receive different MBMS classes. If there are many WTRUs that are in an RRC connected mode (more than specified threshold) requesting specific MBMS services, to avoid majority of WTRUs to switch between dedicated and mixed cell for that specific MBMS service, the network may decide to deliver that specific MBMS service in the mixed cell and allocate new radio resource for MBMS transmission. This configuration may be signaled in an MCCH. The specific MBMS service may be suspended and transferred to the MBMS dedicated carrier and the resource may be de-allocated if the number of WTRUs and amount of time requesting that MBMS service is lower than a specified threshold.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of resource management for multimedia broadcast multicast services (MBMS), the method comprising:
performing measurement of signals from neighbor cells;
performing MBMS reception performance evaluation based on MBMS macro-diversity reception from a plurality of cells; and
sending a measurement report and an MBMS reception performance report for single frequency network (SFN) area configuration, wherein the measurement report and the MBMS reception performance report are sent on a condition the MBMS reception performance is below a configured threshold for a configured period of time.

2. The method of claim 1 further comprising:
detecting that a current location is near an SFN area edge, wherein the measurement report and the MBMS reception performance report are sent whenever the SFN area edge is detected.

3. The method of claim 1 wherein the measurement report is combined with one of a tracking area (TA) update message and a routing area (RA) update message.

4. The method of claim 1 further comprising:
detecting an SFN identity (ID) change by reading broadcast channel information; and
reporting the SFN ID change.

5. The method of claim 1 further comprising:
sending one of a cell update message and a radio resource control (RRC) connection request message along with an information element (IE) indicating cell identities (IDs) of all cells being used for macro-diversity MBMS reception if the cell update message and the RRC connection request message are sent for counting purpose.

6. The method of claim 1 further comprising:
if point-to-point (PTP) MBMS transmission is configured, indicating whether MBMS service will be continuously received or suspended and if the MBMS service reception is planned to be suspended, whether the suspension is temporary or not.

7. A wireless transmit/receive unit (WTRU) for resource management for multimedia broadcast multicast services (MBMS), the WTRU comprising:
a measurement unit for performing measurement of signals from neighbor cells;
a processing unit for performing MBMS reception performance evaluation based on MBMS macro-diversity reception from a plurality of cells; and
a controller for sending a measurement report and an MBMS reception performance report for single frequency network (SFN) area configuration, wherein the controller detects that a current location is near an SFN area edge and sends the measurement report and the MBMS reception performance report on a condition the SFN area edge is detected.

8. The WTRU of claim 7 wherein the measurement report and the MBMS reception performance report are sent if the MBMS reception performance is below a configured threshold for a configured period of time.

9. The WTRU of claim 7 wherein the measurement report is combined with one of a tracking area (TA) update message and a routing area (RA) update message.

10. The WTRU of claim 7 wherein the controller detects an SFN identity (ID) change based on broadcast channel information and reports the SFN ID change.

11. The WTRU of claim 7 wherein the controller sends one of a cell update message and a radio resource control (RRC) connection request message along with an information element (IE) indicating cell identities (IDs) of all cells being used for macro-diversity MBMS reception if the cell update message and the RRC connection request message are sent for counting purpose.

12. The WTRU of claim 7 wherein the controller is configured to, if point-to-point (PTP) MBMS transmission is configured, indicate whether MBMS service will be continuously received or suspended and if the MBMS service reception is planned to be suspended, whether the suspension is temporary or not.

* * * * *